Jan. 17, 1939.　　C. D. FATOR　　2,143,871
BRAKE NEUTRALIZING DEVICE
Filed Sept. 6, 1935
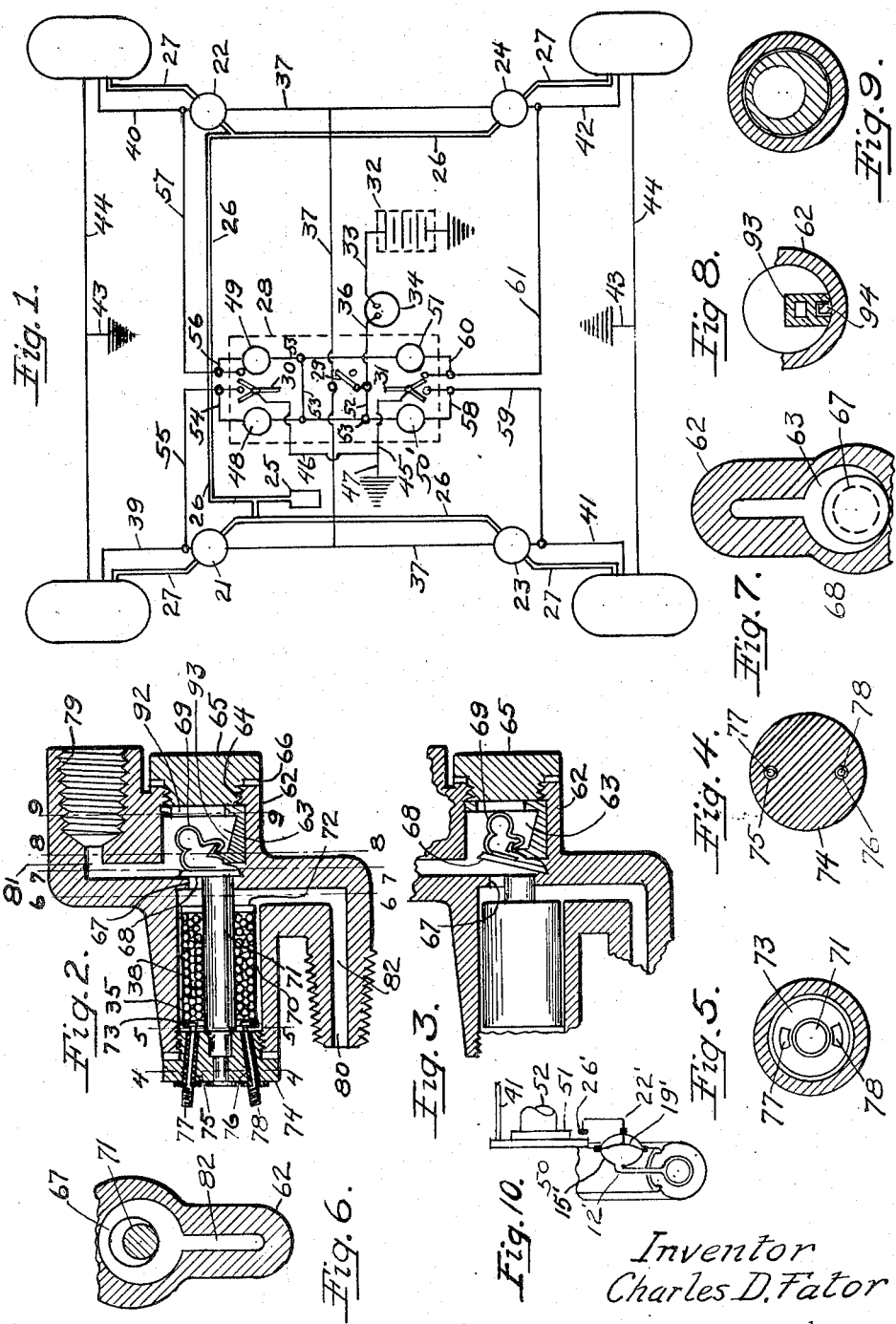
Inventor
Charles D. Fator
By Frank N. Halliday
Attorney

UNITED STATES PATENT OFFICE 2,143,871

BRAKE NEUTRALIZING DEVICE

Charles D. Fator, San Antonio, Tex.

Application September 6, 1935, Serial No. 39,456

18 Claims. (Cl. 188—10)

(Granted under the act of March 3, 1883, as amended April 30, 1928; 370 O. G. 757)

This invention described herein may be manufactured and used by or for the Government for governmental purposes, without the payment to me of any royalty thereon.

This invention relates in general to a safety braking device for rubber tired vehicles, but more particularly to a brake neutralizer adapted to equalize the braking effect upon the wheels of a vehicle to compensate for the retarding effect caused by the increased resistance of one or more deflated tires.

The principal object of the invention is to provide a device of the class described, which will render selectively ineffective the braking mechanism in respect to any of the wheels of a motor vehicle to avoid side drag of the vehicle and prevent skidding from the road upon the deflation of one or more tires.

The deflation of the tires of a traveling motor vehicle produces a drag on the wheel on which the deflated tire is mounted. This is true for any amount of deflation, but becomes more pronounced and even dangerous depending upon the amount of deflation and the speed of the moving vehicle.

In the case of slight deflation, the tire is subjected to cutting by the rim, tearing of the tubes or pulling out of the valve stem due to slipping, and in the case of total deflation as caused by a blow-out the car is apt to skid from the road due to the excessive side drag which may even cause the casing to be torn from the rim.

With the ordinary braking system now in use, on the occasion of a blow-out the car immediately starts to swerve and the driver in order to avoid possible collision or upsetting of the car applies the brakes. The application of the brakes increases the drag on the wheel having the deflated tire and even though the driver succeeds in bringing the car to a stop, this braking action has caused a slipping betwen the tire and the rim, resulting perhaps in the pulling out of the valve stem and the rolling off of the casing.

In order to prevent these damaging and often dangerous effects of deflation, the device which forms the subject matter of this invention was designed. This device relieves the excessive drag on the deflated tire, by totaly neutralizing the brake pressure on the wheels on which the deflated tires are mounted.

The invention consists in the novel construction and combination of parts and of electric circuits hereinafter more fully described whereby when the air pressure within the tire reaches a low point, such as when the tire is flat, or nearly so, insofar as the "drag" effect is concerned, a signal is registered showing which tire is deflated and the brake on the wheel on which the deflated tire is mounted is caused to be automatically released, thereby equalizing the braking effect on all wheels. The driver of the car, as soon as the "drag" occurs, immediately applies his brakes, which serves to produce a more or less nearly equal drag on the wheel opposite the wheel having the defective tire, to counter-act the drag from the flat tire. This is especially important where a front tire goes flat and the drag or braking effect on the two front wheels can be maintained nearly equal, until the car can be stopped safely. Thus an equalized braking or "drag" effect is maintained on each wheel of the automobile, it being stopped even though one or more of the tires are flat, with no tendency for the automobile to be "pulled" off the road. Since the brake on the wheel having the defective tire cannot be applied (is neutralized) there is a minimum of danger or possible damage to the innertube or tire in stopping the automobile or other vehicle.

Aside from the automatic brake neutralizing action set forth in this invention, the brakes can be neutralized by manually operated controls for the purpose of testing or for other special purposes. Though solenoids and controllable electric circuits are used as the most desirable means to cause the brake neutralizer to function, a mechanical releasing mechanism (automatic or manually operated) may be used, and still be within the scope of my invention.

For automatically closing the electric circuit operating my neutralizer device, any pressure operated contact switch which will close the circuit when the air pressure in a tire reaches a minimum of 5 to 3 lbs. per square inch, may be used on each wheel or tire. These pressure operated contact switches are also utilized to operate a sub-pressure indicating device which functions to notify the driver of the under inflation of any of the tires, as will be described further. To carry out the spirit of my invention for use on the different types of brake mechanisms, I have invented a special device for neutralizing both the hydraulic and mechanical types of brakes. The following specification relates to the structure pertaining to the hydraulic type of brake, apparatus for operating the mechanical type of brake forming the subject matter of another application.

The hydraulic type of brake, for which the structure set forth in this application was especially designed and which is now in general use on automobiles, comprises a master cylinder operated by the driver which forces fluid through conduits leading to individual brake cylinders which operate the brake shoes. The safety device operates to prevent the flow of fluid from the master cylinder to the brake energizing cylinder of a wheel when the pneumatic tire thereon has become deflated, thereby neutralizing the brake for that particular wheel automatically.

This invention consists in the combination of parts and eletcric circuits whereby the deflation of any tire or tires causes a solenoid to be electrically energized and thus attract and move to the closed position a soft iron disc valve, said valve preventing the flow of energizing fluid to the wheel brake energizing cylinder. Cutting off the electric current to said solenoid allows the disc valve to resume its open position, which is its normal position. The structure of the apparatus showing the electrical circuits and working parts are illustrated in the following figures, in which—

Fig. 1 is a diagrammatic view showing the lay-out of the electrical circuit and working parts of the braking system as arranged on the automobile;

Fig. 2 is a cross-section through the center of the electrically operated cut-off valve showing the valve in closed position, Fig. 3 is a partially sectionalized view of the cut-off valve showing the valve in open position;

Fig. 4 is a view taken through section 4—4 of Figure 2;

Fig. 5 is a view taken through the section 5—5 of Fig. 2;

Fig. 6 is a view taken through the section 6—6 of Figure 2;

Fig. 7 is a view taken through the section 7—7 of Figure 2;

Fig. 8 is a view taken through the section 8—8 of Figure 2, and

Fig. 9 is a view taken through the section 9—9 of Figure 2.

Fig. 10 is a diagrammatic view showing the pressure operated contact switch attached to a tire.

In describing the various working parts of the apparatus it will be advantageous first to consider the general lay-out and arrangement thereof with respect to the chassis of an automobile and for this purpose reference will be had to Figure 1, which shows the wiring diagram and approximate location of the various parts.

In Figure 1 the automatic cut off or neutralizer valve, the detail construction of which is shown in Fig. 2, is indicated by the numerals 21, 22, 23 and 24, one for each brake. The hydraulic feed lines from the master brake cylinder 25 to the brake energizing cylinders (the latter not shown) are indicated by the numerals 26 and 27. The portions 26 serving as conduits of the hydraulic brake fluid from the master cylinder 25 to the four neutralizer valves 21, 22, 23 and 24 and the portions indicated by the numeral 27 serve as conduits for the fluid from the neutralizer valves to the brake energizing cylinders (not shown).

Figure 1 also shows the indicator and control panel 28 on which are mounted the brake neutralizer circuit "on" and "off" switch 29, and the switches 30 and 31 which are manually controlled for neutralizing either the two front wheel or two rear wheel brakes, a feature which may be desirable for special reasons, such as to neutralize both front wheel brakes while driving on slippery pavement.

Current for energizing the circuits shown in this invention is supplied from the automobile storage battery 32 through the short connecting lead 33 and ignition switch 34, thus this neutralizer system can operate only when the ignition is "on".

In the diagram of Figure 1, let it be understood that each wheel has mounted thereon a separate pressure operated contact switch which serves to close the electric circuit to its respective solenoid in the brake neutralizer valves 21, 22, 23 and 24. Pressure operated contact switches of the type desired usually include a contact device operated by the movement of a diaphragm which is controlled by the air pressure within the tire, as shown, for example in the patent of Ernst Mattern, No. 1,798,615, and illustrated diagrammatically in Fig. 10. As shown in this figure a pneumatically operated diaphragm 19' is mounted within the housing 15', which latter is connected to the inner tube of the tire through the nipple 12'. A plunger 22' operated by the diaphragm is provided with a brush contact member 26'. To the axle 52, or bearing spindles, is rigidly attached a contact ring 50, insulated therefrom by a plate 51. On deflation of the tire the diaphragm is retracted and the brush 26' brought into contact with ring 50 and a circuit is thus established through the conductor 41 and ground leads 43 and 44. The solenoids of these valves derive current from the battery 32 through the ignition switch 34 which is coupled to the battery by the short lead 33. Current from the ignition switch 34 is conducted to the solenoids 35 of the neutralizer valves 21, 22, 23 and 24 through the conductor 36, switch 29, conductors 37 and through the coil 38 of the solenoid 35, and then to the pressure operated contact switches through the conductors 39, 40, 41 and 42. The pressure operated contact switches are grounded through the leads 43 and 44. When controlling the brake neutralizer valves 21, 22, 23 and 24 by the switches 30 and 31 the current is grounded through the conductors 45 and 46 and the short lead 47. That portion of the hydraulic brake mechanism connected to the wheels, is shown in the figures since this portion of the apparatus may be of any type now in use. The sub-pressure indicators are controlled by the pressure operated contact switches, which, when the inflation of the tire decreases to a certain fixed amount, complete a circuit which causes the illumination of signal lamps located on the instrument board of the car and thus notify the driver that a particular tire is deflated beyond a safe driving pressure.

Figure 1 shows diagrammatically the indicator lamps 48, 49, 50' and 51 mounted on the signal and control panel 28. The two front wheel indicator lamps 48 and 49 are in circuits which are controlled through the switch 30, and the two rear wheel indicator lamps 50' and 51 are in circuits which are controlled by the switch 31. Any lamp 48, 49, 50' and 51 when lighted, indicates that the brake of its respective wheel is neutralized. The power to all lamps is derived from the battery 32 through the lead 33, switch 34, leads 36 and 52 and the common leads 53. The circuit of the lamps 48, 49, 50' and 51 is completed through the leads 54 and 55, 56 and 57, 58 and 59, and 60 and 61 respectively, the leads being connected to the conductors 39, 40, 41 and 42 located in the circuit of sub-pressure indicator described above. Each lamp circuit is completed through its respective pressure operated contact switch of the sub-pressure indicator and the ground lines 43 and 44.

In Fig. 2 is shown the construction of the electrically operated neutralizer valves which are indicated by the numerals 21, 22, 23 and 24 of Fig. 1. These valves are composed of a body 62 which is preferably made of bronze or other suitable material. The body portion 62 is formed with a central valve chamber 63, which terminates on one side in an internally threaded opening 64 provided with a plug 65 and seals the same by means of a gasket 66 which it compresses against the outer wall of the body. The wall of the central valve chamber opposite the plug 65 forms a valve seat and is drilled centrally to provide a valve opening 67 for the passage of hydraulic fluid from the master cylinder to a brake energizing cylinder. Opposite this opening is pivotally mounted a valve disc 68 which is held in open or normal position by a tension spring 69 mounted on a cradle of non-magnetic material.

The cradle 91 fits within the central valve chamber 63 and is retained therein by the screw plug 65. The cradle comprises an annular member 92 provided with a longitudinally extending supporting member 93 having a groove on its exterior surface adapted to straddle the ridge 94 projecting from the wall of the valve chamber 63, to prevent rotation of the cradle within said valve chamber. At its inward extremity the supporting member 93 projects centrally and inwardly into the valve chamber as shown in Fig. 2. To this inward projecting portion is attached the spring 69 which retains the valve disc 68 in open or normal position with respect to the valve opening 67.

Directly in front of the valve opening 67 the body 62 projects to form an annular chamber 70 for the reception of the solenoid 35. The solenoid is composed of a central laminated core 71, wrapped with a coil 38 of magnet wire and secured at either end by the fibre washers 72 and 73. The outer extremity of the annular chamber which holds the solenoid is internally threaded for the reception of a solenoid anchor plug 74. The anchor plug 74 is centrally drilled for the reception of a continuation of the core of the solenoid in order to form a base or support for the solenoid, and it is drilled laterally to accommodate the tubular insulators 75 and 76 into which the binding posts 77 and 78 forming electrical contacts with the terminals of the core at their inner extremity.

Located laterally on either side of center line of the valve chamber 63 and disposed in opposite directions are the inlet and outlet openings designated 79 and 80 respectively which communicate with said chamber, the former for the reception of hydraulic fluid from the master cylinder and the latter for the passage of this fluid to the brake energizing cylinder. The inlet opening 79 is internally drilled for connection with the conduit 26 and the outlet opening 80 is drilled for connection with the conduit 27, as shown in Figure 1. The inlet opening 79 communicates with a passage 81 which conducts the hydraulic fluid into the valve chamber and the outlet opening 80 communicates with a passage 82 which conducts the fluid from the valve chamber when the valve is in open or normal position.

Figure 3 which is similar to Figure 2 shows the central portion of the neutralizer valve when the valve disc is in open position so that the hydraulic fluid can pass freely through the valve. This showing represents the valve under normal conditions when the tire of the corresponding wheel is normally inflated. The remaining figures are self-explanatory, being sections through various portions of the valve explained above, and are added for the sake of clearness.

The operation of the device is as follows: When any tire deflates the pressure operated contact switch of the sub-pressure indicator, connected to that particular tire, closes a circuit connected to a signal lamp mounted on the instrument board, as explained above. This circuit also connects with the solenoid of a neutralizing valve which controls the flow of brake fluid to the brake energizing cylinder of the wheel on which the deflated tire is mounted, and energization of this solenoid prevents the operation of the brake shoes on the drum of this particular wheel. Thus the driver is notified of the deflation of any tire and the brake to the wheel bearing that tire is neutralized simultaneously with the closing of the contact switch.

Having described my invention, what I claim as new and wish to secure by Letters Patent is:

1. In combination with a braking system for pneumatic tired vehicles, control means connected to the tires of said vehicle and actuated by their pressures and electrically actuated means operated by said control means adapted to proportion the braking effect on the wheels thereof to compensate for retardation caused by the increased resistance of deflated tires.

2. In combination with a braking system for pneumatic tired vehicles, control means connected to the tires of said vehicle and actuated by their pressures and electrically actuated means operated by said control means adapted to render ineffective the individual braking of the wheels thereof to compensate for retardation caused by the increased resistance of a deflated tire on any of said wheels.

3. In combination with a braking system for pneumatic tired vehicles, pressure operated contact switches operatively connected to the individual tires of said vehicle and electrically actuated means controlled by said pressure operated contact switches and operatively connected to the braking system adapted to render the same ineffective with respect to the wheels of said vehicle having deflated tires.

4. In combination with a braking system for vehicles having pneumatic tired wheels, electrically operated means adapted to render the individual brakes on said wheels ineffective, and pneumatically actuated means operated by the deflation of the tires adapted to control said first mentioned means to neutralize the braking effect on the wheels of said vehicle with the deflation of said tires.

5. In combination with a braking system for vehicles having pneumatic tired wheels, a deflation indicator including pressure operated contact switches operatively connected to each of said tires, neutralizing valves adapted to render the individual brakes of each wheel ineffective, and means for operatively connecting said pressure operated contact switches with said neutralizing valves to provide for the control thereof with respect to the deflation of any tire.

6. In combination with a braking system for vehicles having pneumatic tired wheels a deflation indicator including pressure operated contact switches operatively connected to each of said tires, neutralizing valves adapted to render the individual brakes of each wheel ineffective, and means comprising an electrical circuit operatively connecting said pressure operated contact switches with said neutralizing valves to provide for the control thereof with respect to the deflation of any tire.

7. In combination with a braking system for vehicles having pneumatic tired wheels, a deflation indicator including a block of electrically operated signal devices, pressure operated contact switches in circuit with said signal devices and adapted to control the same with the deflation of the respective tires, electrically controlled neutralizing valves adapted to render the individual brakes of each wheel ineffective and manually operated switches adapted to control the operation of said neutralizing valves.

8. In combination with a hydraulic braking system for pneumatic tired vehicles; pressure operated contact switches operatively connected to the individual tires of said vehicles and means controlled by said pressure operated contact switches and operatively connected to the hydraulic braking system adapted to render the same ineffective with respect to the wheels of said vehicle having deflated tires.

9. In combination with a hydraulic braking system for pneumatic tired vehicles, comprising a master cylinder and fluid conduits leading from said master cylinder to individual brake energizing cylinders; pressure operated contact switches operatively connected with the individual tires of said vehicle and neutralizing means comprising electrically operated valves, controlled by said pressure operated contact switches, interposed in each of said conduits, and adapted to prevent the passage of fluid from the master cylinder to said brake energizing cylinders to render ineffective the individual braking of the wheels of said vehicle to compensate for retardation caused by the increased resistance of a deflated tire on any of said wheels.

10. In combination with a hydraulic braking system for pneumatic tired vehicles, comprising a master cylinder and fluid conduits leading from said cylinder to individual brake energizing cylinders; pressure operated contact switches operatively connected with the individual tires of said vehicle, and electrically operated neutralizing means comprising a valve and solenoid for operating said valve, said solenoid being electrically controlled by said pressure operated contact switches, said valves being interposed in each of said conduits, and adapted to prevent the passage of fluid from the master cylinder to said brake energizing cylinders to render ineffective the individual braking of the wheels of said vehicle to compensate for retardation caused by the increased resistance of a deflated tire on any of said wheels.

11. In combination with a braking system for pneumatic tired vehicles, pneumatically operated electric control means adapted to proportion the braking effect on the wheels thereof to compensate for the retardation caused by the increased resistance of deflated tires.

12. A safety device for use upon automobiles having brake means associated with wheels provided with inflated tires comprising, means to render the immediate brake mechanism ineffective when the tire upon any particular wheel is partially deflated, and pressure responsive controls for said means held inactive by air pressure in a properly inflated tire.

13. With an automobile having inflated tires and provided with four-wheel brakes, means actuated by partial deflation of any individual tire to render inoperable the brake mechanism to the wheel mounting said tire, and pressure responsive controls for said means held inactive by air pressure in a properly inflated tire.

14. With an automobile having inflated tires upon the wheels thereof and provided with brake mechanism operating to apply braking force to said wheels, means to render the brake mechanisms of particular wheels inoperative, and air pressure responsive means associated with each of the tires to be actuated by partial deflation of a tire upon one of said particular wheels to operate the means rendering the brake mechanism inoperative upon the wheel carrying the partially deflated tire.

15. In combination with an automobile having four-wheel brakes and provided with inflated tires upon the wheels, means to lock the brake mechanism to each wheel to render the same inoperative, electrically energized means to actuate said locking means, and pressure controlled switch means associated with each tire and actuated by deflation of the tire to close the circuit to the associated electrically energized means.

16. With an automobile having a plurality of wheels each provided with an inflated tire, brake means associated with each of said wheels, means operable to actuate the brake means of the several wheels simultaneously, and air pressure controlled and responsive means effective upon deflation of the tire upon any particular wheel to render inoperative the brake means associated therewith without affecting operation of the main brake actuating means.

17. With an automobile having a plurality of wheels and provided with normally inflated tires upon said wheels, brake mechanism operable to apply braking force to each of said wheels, manually actuatable means to normally apply operating force to the brake mechanism of each of the wheels, individual means to render the brake mechanism of any particular wheel inoperative, electrically energized means rendering said individual means effective, a circuit including said electrically energized means, and air pressure responsive and controlled switch means associated with each tire and also in said circuit effective upon deflation of a tire upon an individual wheel to connect the electrically energized means and thus affect the individual means to render the brake mechanism of the individual wheel inoperative.

18. With a vehicle having a wheel provided with an inflated tire, brake mechanism operative to retard rotation of the wheel, air pressure actuated control means affected by partial deflation of the tire to render the brake means inoperative, and signal means to indicate to an occupant of the vehicle actuation of said control means.

CHARLES D. FATOR.